United States Patent

Akasaka et al.

Patent Number: 5,848,215
Date of Patent: Dec. 8, 1998

[54] STIMULATED BRILLOUIN SCATTERING SUPPRESSED OPTICAL FIBER

[76] Inventors: Youichi Akasaka, B-241, Kyowayukashataku, 3, Tatsumidaihigashi, 4-chome Ichihara-shi Chiba; Masaharu Ohashi, 6-2-203, Higashihara 2-chome, Mito-shi, Ibaraki, both of Japan

[21] Appl. No.: 904,320

[22] Filed: Jul. 31, 1997

[30] Foreign Application Priority Data

Aug. 1, 1996 [JP] Japan ................................ 8-219434

[51] Int. Cl.$^6$ ...................................................... G02B 6/02
[52] U.S. Cl. .............................................................. 385/123
[58] Field of Search ................................... 385/122, 123, 385/128, 129, 141, 147

[56] References Cited

U.S. PATENT DOCUMENTS

| | | | |
|---|---|---|---|
| 5,267,339 | 11/1993 | Yamauchi et al. | 385/123 |
| 5,543,952 | 8/1996 | Yonenaga et al. | 359/181 |
| 5,568,583 | 10/1996 | Akasaka et al. | 385/123 |
| 5,677,780 | 10/1997 | Nuyts | 359/161 |
| 5,737,460 | 4/1998 | Damen et al. | 385/24 |
| 5,754,334 | 5/1998 | Artiglia et al. | 359/332 |

FOREIGN PATENT DOCUMENTS 4-367539  12/1992  Japan .

*Primary Examiner*—Akm E. Ullah

[57] ABSTRACT

The invention provides a stimulated Brillouin scattering suppressed optical fiber which is easy to be produced, has an almost zero chromatic dispersion over the entirety of an optical fiber in the lengthwise direction, and has a low light loss. That is, in an optical fiber having a property, by which the chromatic dispersion with respect to optical communication signals becomes zero, obtained by changing the relative refractive index difference of the optical fiber and core diameter in the same increase or decrease direction, the relative refractive index difference of the core and the core diameter R are changed in the lengthwise direction of the optical fiber, and the core diameter R is made smaller in line a decrease the relative refractive index difference of the core while the core diameter R is made larger in line with an increase of the refractive index difference, whereby the chromatic dispersion the designated wavelength band is made nearly equal to zero in the entirety of the optical fiber in the lengthwise direction.

8 Claims, 2 Drawing Sheets

STIMULATED BRILLOUIN SCATTERING SUPPRESSED OPTICAL FIBER

FIELD OF THE INVENTION

The present invention relates to a stimulated Brillouin scattering suppressed optical fiber primarily for use in optical communications.

BACKGROUND OF THE INVENTION

In optical communications where optical fibers are used in order to make the relay interval longer between a light transmission portion and a light reception portion, it has been attempted that signal light inputted into an optical fiber is intensified. Recently, light incidence of high intensity into optical fibers became possible by development of the erbium-doped fiber amplifier (EDFA).

With the use of EDFAs, it has been found that nonlinear phenomena arise in the optical fiber, and in optical communications; thus, it has been necessary to take the nonlinear phenomena into consideration. The nonlinear phenomena have properties such as self-phase modulation, cross phase modulation, four-wave mixing (FWM), etc. The FWM is an effective property which can be used as a light source for wavelength division multiplex (WDM). Furthermore, it has been confirmed that the greater the incident light intensity into an optical fiber becomes, the greater the nonlinear effect occurs.

However, since simulated Brillouin scattering (SBS) occurs when signal light is inputted into an optical fiber and is transmitted therein, the transmission light power could not be made larger even though intensive signal light is inputted into an optical fiber.

The stimulated Brillouin scattering in the optical fiber results from inelastic scattering between the incident light and acoustic phonon in the optical fiber, which is one of the nonlinear phenomena, wherein light signals are scattered backward due to the stimulated Brillouin scattering and the degree thereof is radically increased if the same exceeds the threshold. Resulting from an increase of the stimulated Brillouin scattering, almost no transmission light power changes even though the incidence light power is increased beyond the threshold. Therefore, the stimulated Brillouin scattering becomes a large obstacle when such a nonlinear effect as FWM is attempted to be obtained in the optical communications.

The stimulated Brillouin scattering is likely to occur so far as the fiber structure is uniform in view of the refractive index, etc. of optical fibers. Therefore, in order to suppress the stimulated Brillouin scattering, it may be preferred that the structure of an optical fiber is not made uniform in the lengthwise direction thereof by giving a certain change to the optical fiber in the lengthwise direction thereof.

Therefore, for example, as been proposed in Japanese Patent Publication No. 249329 of 1993, a stimulated Brillouin scattering suppressed optical fiber was obtained, wherein in an optical fiber having its core, the main constituent of which is $GeO_2$ (Germanium oxide) doped quartz, and a clad, the main constituent of which is pure silica, F (fluorine) is doped onto the core and clad and the F dopant density is continuously changed in the lengthwise direction of the core and clad, thereby causing both the refractive index of the core and that of the clad to be continuously changed in the lengthwise direction of the core and clad.

Since, as one of the properties of an optical fiber, the chromatic dispersion in the lengthwise direction is required to be made uniform, an optical fiber proposed above is formed so that the refractive index distribution obtained by standardizing the refractive indexes of the cross-section of optical fiber by the maximum refractive index of the core is made equal over the entirety of the optical fiber in the lengthwise direction (axial direction) (that is, formed so that the relative refractive index of the clad to the maximum refractive index of the core is made equal over the entirety of the core and clad), thereby attempting to make uniform the chromatic dispersion characteristics in the lengthwise direction of optical fibers.

OBJECT AND SUMMARY Of THE INVENTION

However, if fluorine (F) is doped onto both the core and clad as in the optical fiber proposed above, $GeO_2$, doped onto the core is diffused by influences of the doping of F whereby there arises a problem; the transmission loss of optical fibers is increased.

Furthermore, in a case of producing optical fibers proposed above, the optical clad portion, (the portion where light oozes out from the core to the clad side) which gives influences on the dispersion characteristics of the core and optical fiber when producing a base material of optical fibers must be composed along with the care at the same time.

However, there was such a problem where it is difficult to carry out a simultaneous composition by using a VAD (vapor phase axial deposition) method which has been usually known.

The present invention was developed to solve the abovementioned shortcomings. It is therefore an object of the invention to provide an optical fiber for suppressing stimulated Brillouin scatter, which is less in the light loss, easy to produce, and is able to make the chromatic dispersion in the lengthwise direction of an optical fiber almost zero in the use wavelength band.

In order to achieve the above object, the invention is constructed as described below, in order to the solve the shortcomings. The first embodiment of the invention relates to an optical fiber having characteristics by which a relation at which the chromatic dispersion with respect to the designated wave length of optical communication signals becomes zero can be obtained by changing the relative refractive index difference of optical fiber and the core diameter thereof in the same increase or decrease direction, wherein at least the relative refractive index difference of the core and the core diameter of an optical fiber having a clad on the outer circumferential side of the core are changed in the lengthwise direction of the optical fiber, the core diameter is monotonically made smaller, keeping characteristics by which the chromatic dispersion in the abovementioned designated wavelength band becomes almost zero, in line with a monotonical decrease of the relative refractive index difference of the corresponding core, and the core diameter is monotonically formed to be larger, keeping characteristics by which the chromatic dispersion in the abovementioned designated wavelength band becomes almost zero, in line with a monotonical increase of the relative refractive index of the core, thereby the chromatic dispersion is made almost zero over the entirety of the optical fiber in the lengthwise direction.

The second embodiment of the invention relates to an optical fiber having characteristics by which a relation at which the chromatic dispersion with respect to the designated wavelength of optical communication signals becomes zero can be obtained by changing the relative refractive index difference of optical fiber and the core diameter thereof in the different increase or decrease direction, wherein at least the relative refractive index difference of the core and the core diameter of an optical fiber having a clad disposed on the outer circumferential side of the core are changed in the lengthwise direction of the optical. fiber, the core diameter is nonotonically made larger, keeping characteristics by which the chromatic dispersion in the abovementioned designated wavelength band becomes almost zero, as the relative refractive index difference of the corresponding core monotonically becomes smaller, and the core diameter is monotonically formed to be smaller, keeping characteristics by which the chromatic dispersion in the abovementioned designated wavelength band becomes almost zero, as the relative refractive index difference of the core monotonically becomes larger, thereby the chromatic dispersion in the designated wavelength hand is made almost zero over the entirety of the optical fiber in the lengthwise direction.

Furthermore, the third embodiment of the invention relates to an optical fiber, having a clad of a smaller refractive index than the core disposed on the outside of the core so as to surround the periphery of the core, in which the core is composed of the center core at the center portion and side core which surrounds the center core and has a smaller refractive index than the center core and a larger refractive index than the clad in order to make the refractive index distribution dual shaped, wherein the outer diameter of the side core is almost constant in the lengthwise direction of the optical fiber and the ratio of the relative refractive index difference of the center core and the relative refractive index difference of the side core is changed in the lengthwise direction of the optical fiber, keeping characteristics which make almost zero the chromatic dispersion in the designated wavelength band of optical communication signals over the entirety of the optical fiber in the lengthwise direction.

Furthermore, in the constructions described with reference to the first, second and third embodiments of the invention, it is also one feature that the designated wavelength of optical communication signals is 1.55 μm.

In the invention constructed as described above, the relative refractive index difference and core diameter are formed corresponding to the relation between the zero dispersion wavelength of an optical fiber, relative refractive index difference, and core diameter. With the first invention, the core diameter is made monotonically smaller as the relative refractive index difference of the core is made smaller, and the core diameter is monotonically made larger as the relative refractive index difference is monotonically made larger, whereby since an optical fiber is formed so that the chromatic dispersion at the use wavelength band of interest (designated wavelength band) becomes almost zero over the entirety of the optical fiber in the lengthwise direction, it is possible to suppress an increase of the chromatic dispersion of optical communication signals. With the embodiment of the second invention, the core diameter is monotonically made larger in line with a monotonical decrease of the relative refractive index difference of the core and the core diameter is monotonically formed to be smaller in line with a monotonical increase of the relative refractive index difference of the core, wherein since an optical fiber is formed so that the chromatic dispersion at the use wavelength band (designated wavelength band) becomes almost zero over the entirety of the optical fiber in the lengthwise direction, it is possible to suppress an increase of the chromatic dispersion of optical communication signals.

Thus, since the relative refractive index difference of the core and core diameter of an optical fiber are changed in the lengthwise direction of the optical fiber, the optical fibers according to the first and second embodiments of the invention can suppress stimulated Brillouin scattering by the uneven structure of the optical fibers in the lengthwise direction.

Furthermore, with the third invention, since characteristics by which the chromatic dispersion becomes almost zero over the entirety of the optical fiber in the lengthwise direction are retained, it is possible to suppress an increase of the chromatic dispersion of optical communication signals. Furthermore, since the ratio of the relative refractive index difference of the center core to the relative refractive index difference of the side core is changed in the length direction of an optical fiber, an effect of suppressing stimulated Brillouin scattering can be obtained as well as the first and second embodiments of the invention.

Furthermore, differing from a conventional optical fiber which suppresses stimulated Brillouin scattering by changing the F doping density in the lengthwise direction of the optical fiber, with an optical fiber according to the present invention, any transmission loss, which may result from the diffusion of $GeO_2$, in line with a doping of F in the conventional optical fiber is not produced, and it is not necessary to compose the core portion being the major material of optical fiber and the optical clad portion at the same time when producing an optical fiber. Therefore, it is easy to produce an optical fiber according to the present invention and to obtain a stimulated Brillouin scattering suppressed optical fiber having a low transmission loss. Furthermore, such an excellent effect can be held, where the chromatic dispersion in the lengthwise direction of an optical fiber can be made almost zero.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, wherein.

DETAILED DESCRIPTION OF THE PREFERRED EMBODIMENTS

Figure 1:
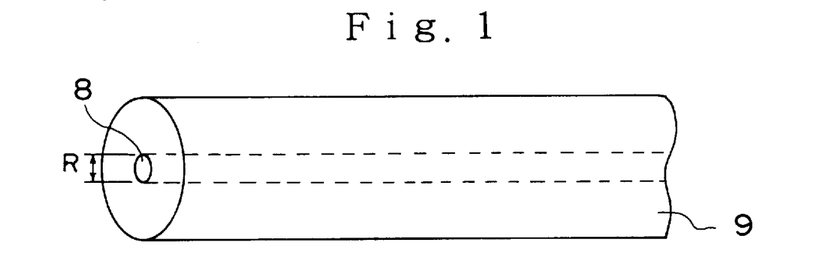
FIG. 1 is a constructional view showing a preferred embodiment of a stimulated Brillouin scattering suppressed optical fiber according to the invention.

Hereinafter, a description will be given of preferred embodiments with reference to the accompanying drawings. FIG. 1 shows the construction of the first and second preferred embodiments of a stimulated Brillouin scattering suppressed optical fiber according to the invention. FIG. 2A and FIG. 2B and FIG. 3A and FIG. 3B respectively show the profiles of the refractive index distribution of a stimulated Brillouin scattering suppressed optical fiber according to the first and second preferred embodiments. As shown in these drawings, a stimulated Brillouin scattering suppressed optical fiber according to the first and second preferred embodiments is an optical fiber having a clad 9 formed on the outer circumferential side of the core 8, the length of which is 20 Km. In these drawings, R shows the diameter of the core 8, $R_{IN}$, is the core diameter at the incident side of the optical fiber, $R_{EX}$ is the core diameter at the out-going side of the optical fiber, and a Δ+ shows the relative refractive index difference of the core 8 to the clad 9.

Figure 2A:
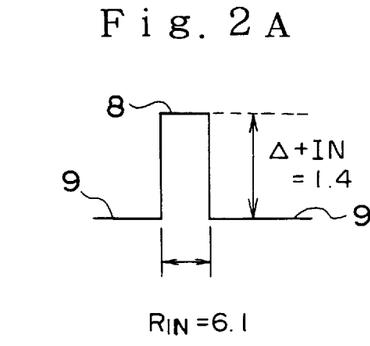
FIG. 2A and 2B are explanatory views showing the refractive index distribution profile of a first preferred embodiment of a stimulated Brillouin scattering suppressed optical fiber according to the invention.
Figure 2B:
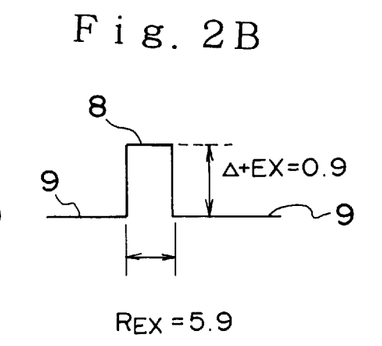

As shown in FIG. 2A and FIG. 2B, the refractive index distribution profile of a stimulated Brillouin scattering suppressed optical fiber according to the first preferred embodiment is unimodal. On the other hand, a stimulated Brillouin scattering suppressed optical fiber according to the second preferred embodiment is, FIG. 3A and FIG. 3B, comprised of having a center core 8a and a side core 8b which surrounds the outer, circumferential side of the center core 8a, and the optical fiber is constructed so that the relative refractive index difference Δ s+ of the side core 8b is formed to be smaller than the relative refractive index difference Δ c+(Δc+=Δ+) of the center core 8a, thereby fonning a dual shape profile. In FIG. 2A, FIG. 2B, FIG. 3A and FIG. 3B, Δ +IN shows the relative refractive index difference of the core 8 at the incident end of the optical fiber and Δ +EX shows the relative refractive index difference of the core 8 at the outgoing side of the optical fiber.

Figure 3A:
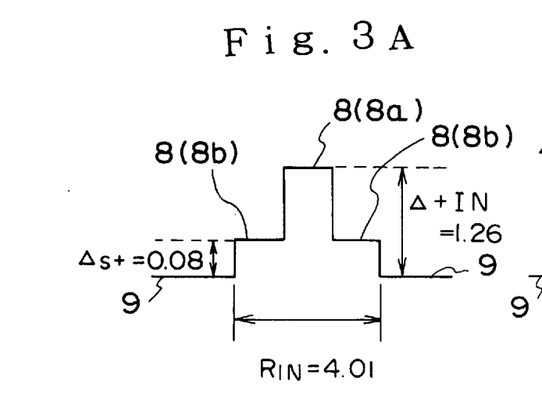
FIG. 3A and FIG. 3B are explanatory views showing the refractive index distribution profile of a second preferred embodiment of a stimulated Brillouin scattering suppressed optical fiber according to the invention.
Figure 3B:
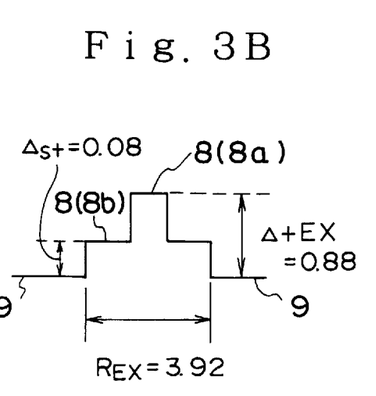

As shown in FIG. 1 through FIG. 3, in a stimulated Brillouin scattering suppressed optical fiber according to the first and second preferred embodiments, the diameter R of the core 8 and the relative refractive index difference Δ+ of the core 8 are changed in the lengthwise direction of the optical fiber, wherein the preferred embodiments are characterized in that the diameter R of the core 8 is made smaller in line with a decrease (getting small) of the relative refractive index difference Δ+ of the core 8 and the diameter R of the core 8 is made larger in line with an increase (getting large) of the relative refractive index difference Δ+ of the core 8, thereby the chromatic dispersion at the use wavelength band (1.55 μm band) is formed to be almost zero over the entirety of an optical fiber in the lengthwise direction. Furthermore, an optical fiber according to the first and second preferred embodiments has a characteristic shown at an area "a" in FIG. 4. That is, the relation that the chromatic dispersion with respect the designated wavelength (1.55 μm) of optical communication signals becomes zero over the entirety in the fiber length is obtained by increasing or decreasing the relative refractive index difference Δ (relative refractive index difference Δ+ of the core) of the optical fiber and the radius of the core 8 in the same direction.

Figure 4:
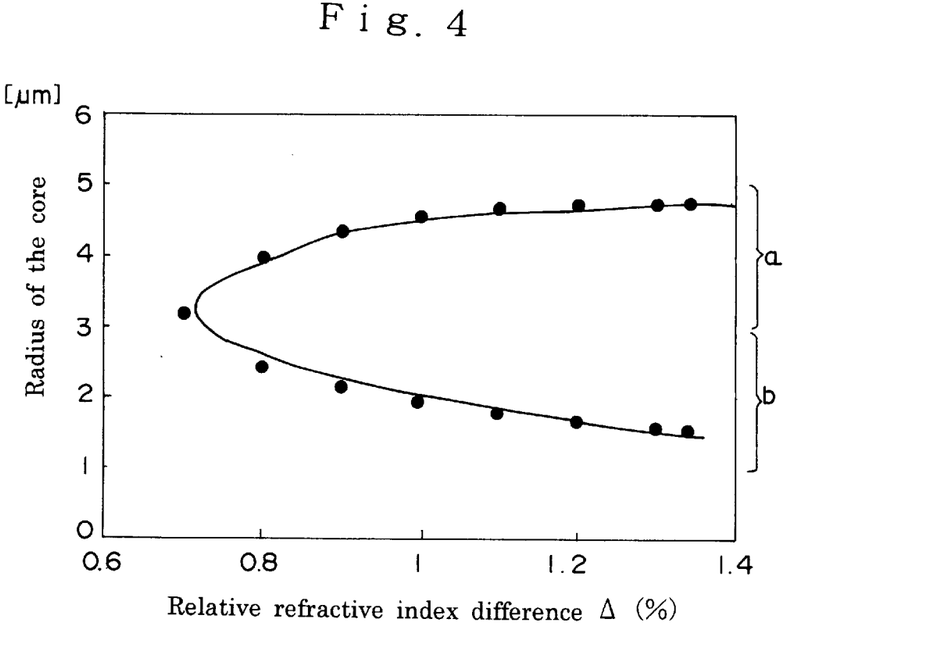
FIG. 4 is a graph showing one example of the relations between the relative refractive index difference and core radius so that the zero dispersion wavelength of a step index optical fiber becomes 1.55 μm.

With a step index optical fiber which the profile of refractive index distribution is like stairs, like an optical fiber according to the preferred embodiment, the relationship between the relative refractive index difference Δ+ of the core and the radius "a" of the core in an optical fiber having a dual shape profile, the value of the zero dispersion wavelength; λ is 1.55 μm, becomes the relation shown in FIG. 4 on the basis of the already known calculate on method. The slopes of the characteristic lines in the areas "a" and "b" are reversed. An optical fiber having the relation shown in FIG. 4 is an optical fiber in which $R_d$ is 0.2 and $R_a$ is 0.4, where $R_d$ is the ratio of Δ c+ to Δ s+ and R. is the core diameter ratio of the center core to the side core.

Herein, in this optical fiber, a property necessary to keep the zero dispersion wavelength $\lambda_0$, at 1.55 μm while actually changing the relative refractive index difference Δ has any one of the characteristic line in the area "a" and characteristic line in the area "b" in FIG. 4. The present applicant took note of the relation of the characteristic line A, that is, the relation between the relative refractive index difference Δ and cut off wavelength $\lambda_c$, and the relation of the characteristic line B, that is, the relation between the relative refractive index difference Δ and the mode field diameter of the optical fiber, both of which are shown in FIG. 5.

Figure 5:
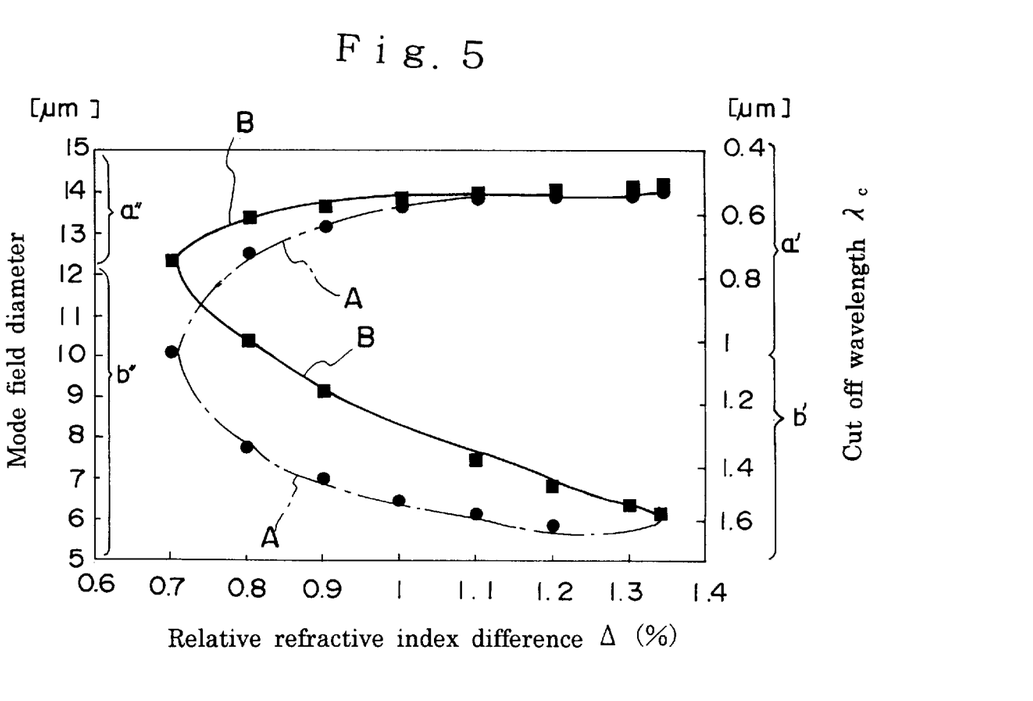
FIG. 5 is a graph showing one example of the relation between the relative refractive index difference and cut off wavelength of a step index optical fiber and the mode field diameter.

If the characteristic line shown in FIG. 4 corresponds to the characteristic line A shown in FIG. 5, the area "a" in FIG. 4 corresponds to the characteristic line A in the area "b" in FIG. 5. Contrarily, the characteristic line in the area "b" in FIG. 4 corresponds to the characteristic line A in the area "a" in FIG. 5.

On the other hand, while the characteristic line B in FIG. 5 shows the relationship between the relative refractive index difference and the mode field diameter, the mode field diameter of an optical fiber gets small as the radius "a" of the care gets large, and contrarily gets large as the radius "a" of the core gets small. When taking note of this point, if the characteristic line B is caused to correspond to the characteristic line in FIG. 4, the characteristic line at the area "a" in FIG. 4 corresponds to the characteristic line B in the area "a" in FIG. 5, and the characteristic line at the area "a" in FIG. 4 corresponds to the characteristic line B of the area "a" in FIG. 6.

Therefore, in a case where the characteristic line in the area "a" in FIG. 4 is chosen, the cutoff wavelength $\lambda_c$ becomes 500 nm (0.5 μm) or the like, and the mode field diameter becomes 14 μm or the like. It is made impossible to meet the propagation conditions of optical signals at a wavelength band of 1.5 μm. Therefore, an optical fiber which is very practical and can keep the zero dispersion wavelength $\lambda_m$ at 1.55 μm while changing the relative refractive index difference Δ will have the property in the area "a" in FIG. 4. An optical fiber of the preferred embodiment has the property in the area "a" in FIG. 4, that is, the same has a property by which the chromatic dispersion becomes zero at the designated wavelength 1.55 μm over the entire area in the length direction of the fiber length and this property can be obtained by increasing or decreasing the relative refractive index difference A of an optical fiber and the radius of the core 8 in the same direction. This is verified by the present inventor.

Furthermore, with an optical fiber having an unimodal refractive index difference profile, it is possible to obtain the relationship similar to that shown in FIG. 4, whereby the applications similar to those of the optical fiber having a dual shape profile are enabled.

Table 1 shows the results which summarize the respective parameters of refractive index distribution structure, etc. with respect to a stimulated Brillouin scattering suppressed optical fiber according to the first and second preferred embodiments. Furthermore, Table 1 also shows the results which summarize those of an optical fiber, as a control A, in which both the diameter R of the core 8 and the relative refractive index difference Δ+ are not changed in the lengthwise direction of the optical fiber, and those of an optical fiber, as a control B, in which the relative refractive index difference Δ+ of the core 8 is not changed in the lengthwise direction of the optical fiber but only the diameter R of the core 8 thereof is changed in the lengthwise direction thereof.

TABLE 1

| Optical fiber | First Preferred Embodiment | Second Preferred Embodiment | Control A | Control B |
|---|---|---|---|---|
| Profile | Unimodal | Stair-like | Stair-like | Stair-like |
| Fiber Length (km) | 20 | 20 | 20 | 20 |
| Core Δ + IN (%) | 1.40 | 1.26 | 0.90 | 0.90 |
| Core Δ + EX (%) | 0.90 | 0.88 | 0.90 | 0.90 |
| Side core Δs + (%) | 0.00 | 0.08 | 0.10 | 0.10 |
| Core Δ change quantity (%) | 0.50 | 0.38 | 0.00 | 0.00 |
| Core Δ change ratio (%) | 0.025 | 0.019 | 0.000 | 0.000 |
| Core diameter $R_{IN}$ (μm) | 6.10 | 4.01 | 4.01 | 3.40 |
| Core diameter $R_{EX}$ (μm) | 5.90 | 3.92 | 4.01 | 6.18 |

Furthermore, each of optical fibers according to the first and second preferred embodiments and optical fibers of controls A and B is constructed so that Ge doped quartz soot forming the core 8 (center core 8a and side core 8b with respect to an optical fiber, the profile of which is dual shape) is formed by using a VAD method, pure silica soot forming the clad 9 is accumulated and formed at the surrounding thereof, thereafter they are vitrified to produce an optical fiber base material, and are made an optical fiber by drawing.

Furthermore, as for the optical fibers according to the first and second preferred embodiments and the optical fiber of the control A, the relative refractive index difference Δ+(Δ+ =Δc+) of the center core 8a or the core 8 is changed in the lengthwise direction of the optical fiber by changing the Ge density of a burner for forming the c enter core 8a or the core 8 during the composition by a VAD method Furthermore, as in the optical fibers according to the first and second preferred embodiments and the optical fiber of the control B, in a case where the diameter of the core 8 is changed in the lengthwise direction of optical fibers, the diameter R of the core 8 is changed in the lengthwise direction by shaping the outer circumference thereof after Ge doped quartz soot is composed, and thereafter a pure silica soot is accumulated and formed thereon.

As Table 1 indicates, in stimulated Brillouin scattering suppressed optical fibers according to the first and second preferred embodiments, the A change ratios (%/km) per kilometer of the core 8 are respectively 0.025 and 0.019 while the change ratios of the controls A and B are zero.

Table 2 shows the results of the investigations that the present applicant actually carried out, with respect to the chromatic dispersion properties, the stimulated Brillouin scattering (SRS) threshold, and existence of FWM light in conjunction with optical fibers according to the first and second preferred embodiments, and controls A and B.

TABLE 2

| Optical fiber | First Preferred Embodiment | Second Preferred Embodiment | Control A | Control B |
|---|---|---|---|---|
| Short dispersion IN (ps/nm/km) | +0.9 | +0.04 | +1.1 | +6.2 |
| Short dispersion EX (ps/nm/km) | −0.2 | −0.02 | +0.5 | −8.5 |
| Mean dispersion (ps/nm/km) | +0.5 | +0.03 | +0.7 | −0.90 |
| Loss (dB/km) | 0.34 | 0.35 | 0.21 | 0.21 |
| SBS generation threshold (dBm) | 15.0 | 13.0 | 7.0 | 12.5 |
| Existence of FMW light | ○ | ○ | Δ | x |

Furthermore, in Table 2, the short dispersion IN shows the results of a chromatic dispersion measurement at the point 1.3 m inside the incident side of an optical fiber, the short dispersion EX shows the results of a chromatic dispersion measurement at the point 1.3 m inside the outgoing side of the optical fiber, and the mean dispersion shows the results of a chromatic dispersion measurement over the entirety of the optical fiber.

It is clear from Table 2, the SBS generation thresholds in the first and second preferred embodiments are 15.0 dBm and 130 dBm, it was confirmed that the SBS suppression effect is high, and it was possible to obtain FWM light of high intensity.

Optical-fibers according to the preferred-embodiments have an property, by which the chromatic dispersion with respect to the designated wavelength of optical communication signals becomes zero, by changing the relative refractive index difference and core diameter of optical fibers in the same increase of decrease direction, wherein the relative refractive index difference Δ+ of the core 8 and the diameter R of the core 8 are changed in the lengthwise direction of the optical fiber, and since the optical fibers a reconstructed so that the diameter R of the core 8 is made smaller in line with a decrease of the relative refractive index difference Δ+ of the core 8, and the diameter R of the core 8 is made larger in line with an increase of the relative refractive index difference Δ+ of the core 8, it is possible to form an optical fiber so that the wavelength at the use wavelength band (designated wavelength band) of 1.55 μm band is made almost equal to zero over the entirety of the optical fiber in the lengthwise direction.

Furthermore, since the optical fibers according to the preferred embodiments are subjected to structural changes in the lengthwise direction by the relative refractive index difference Δ+ of the core 8 and diameter R of the core 8 being changed in its lengthwise direction, it is possible to effectively suppress the stimulated Brillouin scattering.

Furthermore, differing from the proposed optical fibers in which the F doping density is changed in the lengthwise direction of the optical fibers, the optical fibers according to the preferred embodiments does not require any simultaneous composition of the optical clad portion along with the formation of the core 8 wherein after only the core portion forming the core 8 is easily formed by a VAD method, the clad portion may be accumulated and formed on the outer circumferential side thereof Therefore, it will be made easy to produce the base material of optical fibers and accordingly the production of optical fibers can be facilitated. Still furthermore, the transmission loss of optical fibers is not increased by $CeO_2$ diffusion in the core in line with the F doping. Therefore, it is possible to obtain optical fibers which have less light loss.

Furthermore, the invention is not limited to the above-mentioned preferred embodiments, and various modifications and/or variations may be available. For example, the respective parameters of a profile of the optical fiber, length thereof, relative refractive index difference Δ+ of the core 8, diameter R thereof, etc. are not necessarily limited to the figures shown in Table 1, and the optical fibers may have properties, by which a relation at which the chromatic dispersion becomes zero with respect to the designated wavelength of optical comrnmunication signals is established by changing the relative refractive index difference of the optical fiber and the core diameter in the same increase or decrease direction, wherein the relative refractive difference of the core and the core diameter are changed in the lengthwise direction of optical fibers, and it is possible to form optical fibers, in which the chromatic dispersion at the use wavelength band is made almost equal to zero over the entirety of optical fibers in the lengthwise direction, by making smaller the core diameter in line with a decrease of the relative refractive index difference of the core and making larger the core diameter in line with an increase of the relative refractive index difference of the core.

For example, contrary to the abovementioned preferred embodiments, the relative refractive index difference Δ +IN of the core of the incident end of an optical fiber may be made smaller than the relative refractive index difference Δ +EX of the core at the outgoing end of the optical fiber. In this case, the relationship of core diameter IN<core diameter EX will be established.

Furthermore, if an optical fiber has a property by which the relation where the wavelength becomes zero with respect to the designated wavelength of optical communication signals is established by changing the relative refractive index difference of an optical fiber and the core diameter thereof in the same increase or decrease direction (for example, if the optical fiber has a property of the characteristic line in the area "b" in FIG. 4), an optical fiber is formed so that the relative refractive index difference of the core and diameter thereof are changed in the lengthwise direction of the optical fiber, the core diameter is made larger in line with a decrease of the relative refractive difference of the core and is made smaller in line with an increase of the relative refractive index difference of the core, whereby the chromatic dispersion at the use wavelength band may be formed to be equal over the entirety of the optical fiber in the lengthwise direction. However, in this case, the zero dispersion wavelength will be around 0.5 µm as described above.

Furthermore, in the abovementioned preferred embodiments, the optical fiber is constructed so that both the relative refractive index difference of the core 8 and the diameter R of the core 8 are changed in the lengthwise direction of the optical fiber. However, as in the second preferred embodiment, in an optical fiber of a dual shape profile having the center core 8a and side core 8b, it is possible to form a stimulated Brillouin scattering suppressed optical fiber by changing the ratio of the relative refractive index difference between the center core 8a and side core 8b without changing the diameter R of the core 8 in the lengthwise direction thereof.

For example, the present applicant actually produced an optical fiber of which the relative refractive difference (core Δ +N) at the incident end side of the core 8 is 1.23%, the relative refractive difference (core Δ +EX) at the outgoing end side of the core 8 is 0.93%, the relative refractive index difference Δ s+ of the side core 8b is 0.08%, the diameter R of the core 8 is 4.01 µm over the entirety thereof in the lengthwise direction (the change quantity of the core A will be 0.30% and the change ratio of th e core Δ will be 0.015%/km), and measured the dispersion, loss, etc. shown in Table 2 with respect to this optical fiber, the short dispersion IN was +0.12 ps/nm/km, the short dispersion EX was +0.08 ps/nm/km, the mean dispersion was +0.10 ps/nm/km, and the loss was 0.36 dB/km. That is, such good results was obtained, where the chromatic dispersion was made nearly equal to zero over the entirety of the optical fiber in the lengthwise direction, and further the optical transmission loss could be made smaller. Furthennore, it could be confirmed that the SBS generation threshold was high (12.0 dBm) and FWM light of high intensity was generated.

What is claimed is:

1. A stimulated Brillouin scattering suppressed optical fiber having characteristics by which a relation by which a chromatic dispersion with respect to a designated wavelength band of optical communication signals becomes zero can be obtained by changing the relative refractive index difference of optical fiber and the core diameter thereof in the same increase or decrease direction, wherein at least the relative refractive index difference of the core and the core diameter of an optical fiber having a clad on the outer circumferential side of the core are changed in the lengthwise direction of the optical fiber, the core diameter thereof is monotonically made smaller, keeping characteristics by which the chromatic dispersion in said designated wavelength band becomes almost zero, in line with a monotonical decrease of the relative refractive index difference of said core, and the core diameter is monotonically formed to be larger keeping characteristics by which the chromatic dispersion in said designated wavelength band becomes almost zero, in line with a monotonical increase of the relative refractive index of said core, and the chromatic dispersion is thereby made almost zero over the entirety of the optical fiber in the lengthwise direction.

2. A stimulated Brillouin scattering suppressed optical fiber having characteristics by which a relation at which a chromatic dispersion with respect to the designated wavelength of optical communication signals becomes zero, having a relative refractive index difference of said optical fiber and the core diameter thereof in a different increase or decrease direction, wherein at least the relative refractive index difference of said core and the core diameter of an optical fiber having a clad disposed on the outer circumferential side of the core are varied in the lengthwise direction of the optical fiber, said core diameter monotonically increasing, keeping characteristics by which the chromatic dispersion in said de signaled wavelength band becomes almost zero in line with a monotonical decrease of said relative refractive index difference of said core, and said core diameter monotonically decreasing, keeping characteristics by which the chromatic dispersion in said designated wavelength band becomes almost zero, in line with a monotonical increase of the relative refractive index difference of said core, and a chromatic dispersion in the designated wavelength band is thereby made almost zero over the entirety of the optical fiber in the lengthwise direction.

3. A stimulated Brillouin scattering suppressed optical fiber having a clad of a smaller refractive index than a core disposed on an outside of said core so as to surround the periphery of the core, in which said core includes a center core at the center portion and side core which surrounds said center core and has a smaller refractive index than said center core and a larger refractive index than said clad in order to make the refractive index distribution dual shape, wherein the outer diameter of said side core is almost constant in a lengthwise direction of the optical fiber and the ratio of the relative refractive index difference of said center core and the relative refractive index difference of said side core is changed in the lengthwise direction of the optical fiber, keeping characteristics which make the chromatic dispersion almost zero in the designated wavelength band of optical communication signals over the entirety of the optical fiber in the lengthwise direction.

4. A stimulated Brillouim scattering suppressed optical fiber wherein chromatic dispersion with respect to a designated wavelength band of optical communication signals is substantially zero, the optical fiber having a relative refractive index difference between a core of the optical fiber and the core diameter thereof in a same increase or decrease direction, wherein at least the relative refractive index difference of the core and the core diameter of an optical fiber having a clad on the outer circumferential side of the core are changed in the lengthwise direction of the optical fiber, the core diameter thereof being monotonically smaller in line with a monotonical decrease of the relative refractive index difference of said core, and the core diameter being monotonically formed to be larger, in line with a monotonical increase of the relative refractive index of said core, and the chromatic dispersion is thereby made almost zero over the entirety of the optical fiber in the lengthwise direction.

5. A stimulated Brillouin scattering suppressed optical fiber as set forth in claim 1, wherein the designated wavelength of optical communication signals is 1.5 μm.

6. A stimulated Brillouin scattering suppressed optical fiber as set forth in claim 2, wherein the designated wavelength of optical communication signals is 1.5 μm.

7. A stimulated Brillouin scattering suppressed optical fiber as set forth in claim 3, wherein the designated wavelength of optical communication signals is 1.5 μm.

8. A stimulated Brillouin scattering suppressed optical fiber as set forth in claim 4, wherein the designated wavelength of optical communication signals is 1.5 μm.

* * * * *

UNITED STATES PATENT AND TRADEMARK OFFICE
CERTIFICATE OF CORRECTION

PATENT NO. : 5,848,215

DATED : December 8, 1998

INVENTOR(S) : Akasaka et al.

It is certified that error appears in the above-identified patent and that said Letters Patent is hereby corrected as shown below:

Col. 3, line 15, "hand" should read - - band - - .

Col. 5, line 26, "fonning" should read -- forming --.

Col. 5, line 35, "A+" should read - - $\Delta$+ - -

Col. 5, line 58, "A+" should read - - $\Delta$+ - -.

Col. 8, line 59, "CeO$_2$" should read - - GeO$_2$ - -.

Col. 9, line 4, "comrnmunication" should read - - communication - -.

Col. 9, line 61, "core A" should read - - core $\Delta$ - -.

Col. 9, line 62, "th e" should read - - the - -.

Col. 10, line 41, "de signaled" should read - - designated - -.

Signed and Sealed this

Sixth Day of July, 1999

Attest:

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,848,215
DATED : December 8, 1998
INVENTOR(S) : Akasaka, et. al.

It is certified that error appears in the above-identified patent and that said Letters Patent is hereby corrected as shown below:

Title page, item [73], Assignee:  should read --The Furukawa Electric Co. Ltd.--

Signed and Sealed this

Twenty-second Day of August, 2000

*Attest:*

Q. TODD DICKINSON

*Attesting Officer*      *Director of Patents and Trademarks*